United States Patent [19]

Tanaka et al.

[11] Patent Number: 4,861,142
[45] Date of Patent: Aug. 29, 1989

[54] PROJECTION TYPE LIQUID CRYSTAL DISPLAYING DEVICE

[75] Inventors: Sakae Tanaka; Tadahiko Yamaoka; Shingo Takahashi; Tomoaki Takahashi, all of Tokyo, Japan

[73] Assignee: Seikosha Co., Ltd., Japan

[21] Appl. No.: 49,718

[22] Filed: May 12, 1987

[30] Foreign Application Priority Data

May 12, 1986 [JP] Japan ................................ 61-108257
Jul. 8, 1986 [JP] Japan ................................ 61-159934

[51] Int. Cl.⁴ .......................... G02F 1/13; G02F 1/23; G03B 21/26
[52] U.S. Cl. ..................................... 350/345; 350/338; 350/337; 350/408; 353/34; 353/37
[58] Field of Search ................ 350/338, 345, 337, 342, 350/408; 353/34, 37

[56] References Cited

U.S. PATENT DOCUMENTS 4,256,368 3/1981 Task ..................... 350/408
4,345,258 8/1982 Tsai et al. ................... 353/31
4,796,978 1/1989 Tanaka et al. ............... 350/337

FOREIGN PATENT DOCUMENTS 60-2916 1/1985 Japan .

*Primary Examiner*—Stanley D. Miller
*Assistant Examiner*—Huy Kim Mai
*Attorney, Agent, or Firm*—Bruce L. Adams; Van C. Wilks

[57] ABSTRACT

Light emitted from a single light source is split into beams of bidirectional parallel light which are orthogonal to each other. Beams of the parallel light in each direction are reflected by a reflection optical system in such a direction that they become orthogonal to each other. A dichroic mirror is disposed at a point of intersection thereof and liquid crystal panels are provided between each individual reflection optical system and the dichroic mirror resulting in a low cost device which can be structurally miniaturized and which requires less process steps in fabrication.

3 Claims, 3 Drawing Sheets

PROJECTION TYPE LIQUID CRYSTAL DISPLAYING DEVICE

TECHNICAL FIELD OF THE INVENTION

The present invention is directed to a projection type liquid crystal displaying device.

DESCRIPTION OF THE RELATED ART

A conventional projection type liquid crystal displaying device is disclosed in the specification of Japanese Patent Laid-Open No. 2916/1985. This device is arranged in such a way that: three pieces of liquid crystal panels on which picture elements of R, G, B are formed are employed; the individual panels are equipped with light sources; and the picture elements are displayed on the screen by synthesizing beams of light transmitting the liquid crystal panels with the aid of a dichroic mirror.

OBJECT OF THE INVENTION

The foregoing conventional device is attended with defects wherein it unfavourably requires three light sources, its efficiency of utilizing the light is lowered, and deterioration in the lamp causes scattering which further conduces to a decrease in quality of the picture. The device employs the three lamps and three pieces of liquid crystal panels, this leading to an increase in size of the whole constitution. In addition, a variety of dichroic mirrors which differ from each other have to be used. This arrangement brings about a rise in the cost of production.

Accordingly, it is a primary object of the present invention to provide a projection type liquid crystal displaying device which requires a single light source alone and can be miniaturized.

CONSTITUTION OF THE INVENTION

A projection type liquid crystal displaying device according to the present invention is constituted such that: the light emitted from a single light source is split into beams of bidirectional parallel light which are orthogonal to each other; beams of the parallel light in each direction are reflected by a reflection optical system in such a direction that they become orthogonal to each other; a dichroic mirror is disposed at a point of intersection thereof; and liquid crystal panels are provided between each individual reflection optical system and the dichroic mirror.

DESCRIPTION OF THE PREFERRED EMBODIMENT

Figure 1:
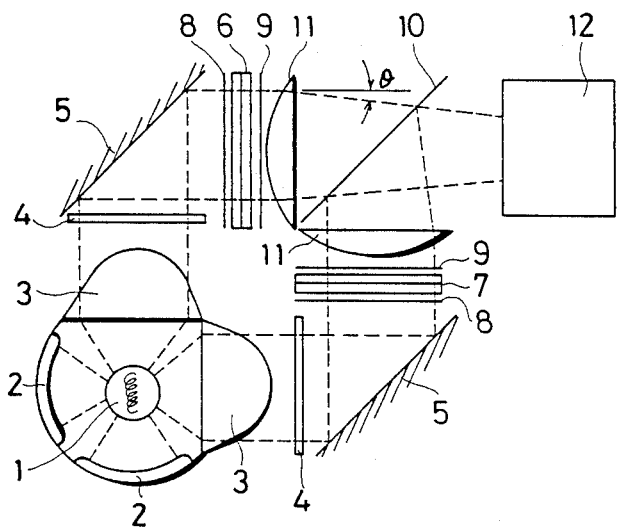
FIG. 1 is an explanatory view showing one embodiment of the present invention.
Figure 2:
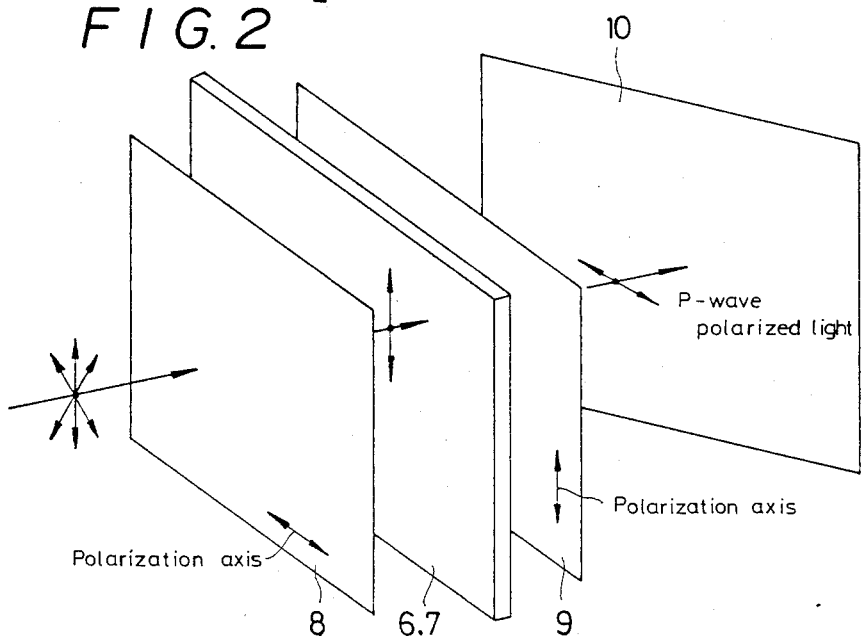
FIG. 2 is a perspective view showing a part extracted from FIG. 1.

In FIG. 1, the numeral 1 represents a light source such as a halogen lamp or a xenon lamp; 2, 2 stand for cold mirrors; 3, 3 denote condenser lens for splitting the light coming from the light source into beams of bidirectional parallel light which are orthogonal to each other; and 4, 4 designate heat protecting filters. The numerals 5, 5 stand for reflection mirrors; 6 represents a liquid crystal panel for R and B; and 7 denotes a liquid crystal panel for G. In this embodiment, the liquid crystal panels 6, 7 involve positive TN type liquid crystal. Such is the arrangement that the light of P-wave polarized light falls upon the dichroic mirror 10 by making use of two pieces of polarization plates 8, 9 which have, as illustrated in FIG. 2, polarization axes orthogonal to each other. The numerals 11, 11 represent convex lenses for converging beams of the parallel light by $\theta(0,° \leq \theta \leq 5°)$, and 12 stands for a projection lens system.

In the above-described constitution, the light emitted from the light source 1 strikes directly, or after undergoing reflection on the cold mirrors 2, upon the condenser lenses 3, thereby becoming parallel light. Beams of the parallel light are reflected via the heat protecting filters 4 on the reflection mirrors 5 and are then lead to the liquid crystal panels 6, 7. Beams of the light transmit through the polarization plate 8, the liquid crystal panel 7 and the other polarization plate 9 as well as beams of the light which likewise transmit the polarization plate 8, the liquid crystal panel 6 and the polarization plate 9. The transmitted light is converged by only $\theta$ by the use of the convex lenses 11 and is then led to the dichroic mirror 10 as P-wave polarized light. It is thus feasible to diminish both an aperture of the projection lens system and an aberration.

If $\theta$ is more than 5°, however, colour shading is apt to appear on the picture, which causes a decline in quality of the picture.

The dichroic mirror 10 employed herein is of a G-reflection type wherein the light of G which transmits through the liquid crystal panel 7 is reflected, whereas beams of the light of R and B which pass through the liquid crystal panel 6 further transmit through so as to be synthesized and are then projected by the projection lens system 12.

In this embodiment, the P-wave polarized light is arranged to strike on the dichroic mirror 10. The reason for this is as follows. According to an experiment made by the present applicant, in the case of rectilinear polarization wherein TN (Twist Nematic) type liquid crystal is utilized for the liquid crystal panel, it has been proven that ghost images are created by multiple reflections, depending on the axis of the light falling upon the dichroic mirror, and at the same time the images are of bad colour purity. In the case of incidence of the P-wave polarized light, there is no problem. The incidence of S-wave polarized light, which is in a plane normal to the plane of the P-wave polarized light , however, brings about the above-described problems of ghost images. This is derived from the fact that a reflection factor of the P-wave on the surface of glass is, as shown in FIG. 3, different from that of the S-wave, and the spectral property of the dichroic mirror, as illustrated in FIG. 4, differs with respect to the S-wave and the P-wave.

Figure 3:
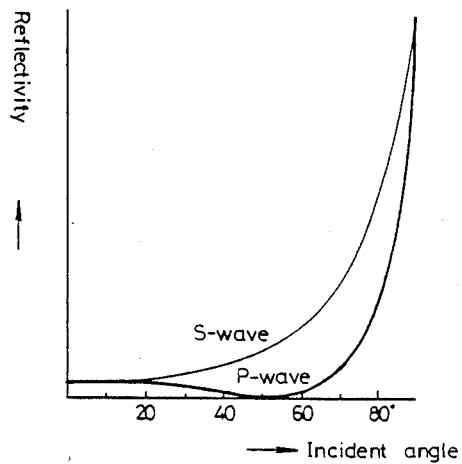
FIG. 3 is a characteristic diagram showing reflectivity on the surface of glass.
Figure 5:
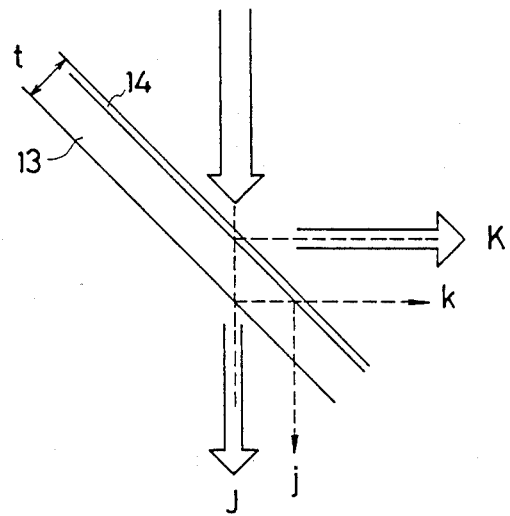
FIG. 5 is an explanatory view showing the light reflected on the dichroic mirror.

It can be understood from FIG. 3 that there is almost no reflection of the P-wave in the vicinity of an incident angle of 45°, whereas the reflection of the S-wave can be seen. This implies that a beam of light k reflected on the surface of a boundary between the glass and the air after transmitting through a multi-layer thin film 14 among beams of light which have unnecessary wavelengths is large when the light of the S-wave falls upon the dichroic mirror 13 in FIG. 5. The same may be said of a beam of transmitted light j. Beams of the reflected light K, k and the transmitted light j strike upon the projection lens system in such a way that they deviate laterally by only 2t when t is defined as the thickness of the glass. Since 10~100-fold magnification is possible in the projection lens, if a mirror having an ordinary thickness of approximately 3 mm is employed, the aforementioned deviation becomes conspicuous and the ghost images are thereby projected.

Figure 4:
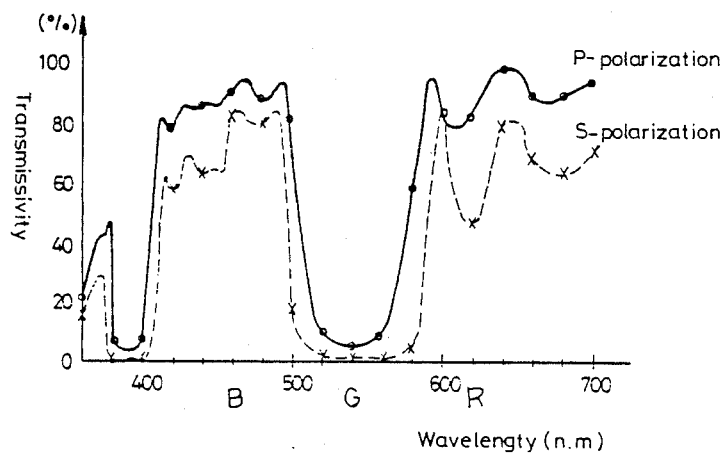
FIG. 4 is a characteristic diagram showing sepctral property of a G-reflection dichroic mirror which makes an incident angle of 45°.

Referring to FIG. 4, there is shown the spectral property of a G-reflection dichroic mirror which makes an incident angle of 45°. As is obvious from FIG. 4, a range of wavelength of the reflected light is comparatively narrow in regard to the P-wave, while on the other hand the S-wave has a relatively wide range. Videlicet, in the case of incidence of the light of the S-wave, the light that is to be reflected ranges from G, R closely to B, and the colour purity is thereby deteriorated.

To cope with this problem, the P-wave polarized light is arranged to fall upon the dichroic mirror 10 in this embodiment. Consequently, almost no reflection of the light with unnecessary wavelengths is made. Furthermore, beams of the reflected light j and k shown in FIG. 5 substantially disappear. As a result, no ghost image is present on the screen, and there is no reflection of the light with unnecessary wavelengths, thereby obtaining images having favourable colour purity.

The light source 1 has heat and hence air-cooling is required. According to the constitution in this embodiment, highly efficient cooling is possible by virtue of ventilation made by actuating a fan on the front side or on the rear side of the Figure.

Figure 6:
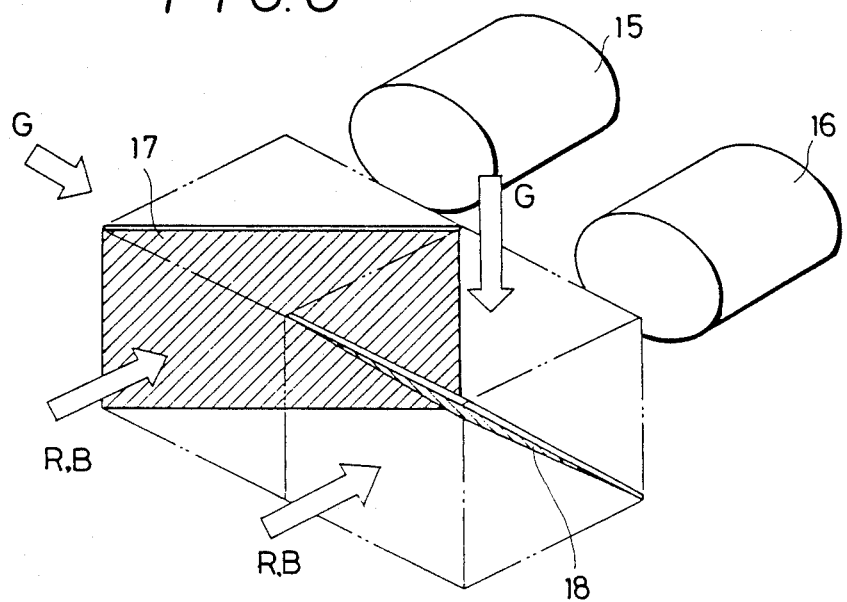
FIG. 6 is an explanatroy view showing a projection lenses and the dichroic mirrors disposed on this side thereof when constructing a displaying device designed for stereoimages.

On the occasion of constituting a displaying device for stereoimages by making use of two units of the devices illustrated in FIG. 1, the arrangement may be such that G-reflection dichroic mirrors 17, 18 corresponding to the dichroic mirror 10 shown in FIG. 1 are, as illustrated in FIG. 6, disposed in front of projection lenses 15, 16. In this case, the dichroic mirrors 17, 18 admit beams of the light of R, B which emerge from the front surfaces of the projection lenses 15, 16, and at the same instant beams of the light of G are made to fall from the side portion of the dichroic mirror 17 and from the upper portion of the dichroic mirror 18. With this step, beams of the light of R, G, B are synthesized by the use of the dichroic mirrors 17, 18 and are then led to the projection lenses 15, 16, whereby the stereoimages are projected.

The light which falls upon the dichroic mirrors 17, 18 is confined to the P-wave.

It should be noted that the polarization plates are not necessarily disposed in the front and in the rear of the liquid crystal panel but may be placed on the side of the projection lens or in front of the screen. Even such placement yields the same effects.

In the above-described embodiment, the positive TN type liquid crystal panel is adopted. However, a negative TN type liquid crystal panel possessing two pieces of polarization plates whose polarization axes are parallel with each other may also be used.

EFFECTS OF THE INVENTION

As described above, the present invention yields the following effects. A single light source suffices, and if this is deteriorated, no unevenness in colour is produced. There are advantages in terms of cost and of constitution. The adjustment of the light source can be facilitated. In addition, one piece of expensive dichroic mirror is enough for the arrangement, this leading to the further advantages of being uncostly, noncostly structurally miniaturized and requiring less processes in fabrication.

Inasmuch as the light emitted from the light source is split into beams of bidirectional light which are orthogonal to each other, the light source can easily be cooled off, and an efficiency in utilization of the light can be improved.

After the light which transmits the liquid crystal panel has been converged at a given angle by lens, the thus converged light is synthesized by the dichroic mirror, so that the dichroic mirror can be reduced in size and it is also possible to diminish the aperture for the light falling upon the projection lens system. Hence, the dichroic mirror and the projection lens system do not have to be expensive. Moreover, the aberration in the projection lens system can be decreased, thereby obtaining sharp images.

We claim:

1. A projection type liquid crystal displaying device comprising: a light source; condenser lenses for splitting light emitted from said light source into two orthogonal groups of beams of substantially parallel light; two optical reflection means, each in the path of one of the beams of light, for effecting the beams of the light of the two groups to reflect at a right angle to an area in which the beams of light of the two groups cross each other; a dichroic mirror disposed in said area for synthesizing beams of the light from the two optical reflection means including means for transmitting the light coming from one of said optical reflection means and for reflecting the light from the other of said optical reflection means; a liquid crystal panel comprising green picture elements disposed between said dichroic mirror and one of said optical reflection means; a liquid crystal panel comprising red and blue picture elements disposed between said dichroic mirror and the other of said optical reflection optical means; and projection means for projecting beams of the light from said dichroic mirror.

2. A projection type liquid crystal displaying device comprising: a light source; first condenser lenses for splitting the light emitted from said light source into two orthogonal groups of beams of substantially parallel light; two optical reflection means, each in the path of one of the beams of light, for effecting the beams of light of the two groups to reflect at a right angle to an area in which the beams of the light of the two groups cross each other; a dichroic mirror disposed in said area for synthesizing beams of light from said optical reflection means including means for transmitting the light coming from one of said optical reflection means and for reflecting the light from the other of said optical reflection means; a liquid crystal panel comprising green picture elements disposed between said dichroic mirror and one of said optical reflection means; a liquid crystal panel comprising red and blue picture elements disposed between said dichroic mirror and the other of said optical reflection means; second condenser lenses for converging the light transmitted through each of said liquid crystal panels at a given angle; and projection means for projecting beams of the light from said dichroic mirror.

3. The projection type liquid crystal displaying device as set forth in claim 2, wherein the given angle ranges from 0° to 5°.

* * * * *